(12) United States Patent
Yigzaw et al.

(10) Patent No.: US 9,448,879 B2
(45) Date of Patent: *Sep. 20, 2016

(54) APPARATUS AND METHOD FOR IMPLEMENT A MULTI-LEVEL MEMORY HIERARCHY

(75) Inventors: Theodros Yigzaw, Sherwood, OR (US); Oded Lempel, Amikam (IL); Hisham Shafi, Akko (IL); Geeyarpuram N. Santhanakrishnan, Mercer Island, WA (US); Jose A. Vargas, Rescue, CA (US); Ganapati N Srinivasa, Portland, OR (US); Mohan J Kumar, Aloha, OR (US); Larisa Novakovsky, Haifa (IL); Lihu Rappoport, Haifa (IL); Chen Koren, Folsom, AS (US); Julius Mandelblat, Haifa (IL); Michael Mishaeli, Zichron Yaakov (IL)

(73) Assignee: INTEL CORPORATION, Santa Clara, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/994,105

(22) PCT Filed: Dec. 22, 2011

(86) PCT No.: PCT/US2011/066982
§ 371 (c)(1),
(2), (4) Date: Feb. 20, 2014

(87) PCT Pub. No.: WO2013/095543
PCT Pub. Date: Jun. 27, 2013

(65) Prior Publication Data
US 2014/0298140 A1  Oct. 2, 2014

(51) Int. Cl.
*G06F 11/00* (2006.01)
*G06F 11/10* (2006.01)
(Continued)

(52) U.S. Cl.
CPC ....... *G06F 11/1064* (2013.01); *G06F 11/0793* (2013.01); *G06F 11/1016* (2013.01); *G06F 11/1407* (2013.01)

(58) Field of Classification Search
None
See application file for complete search history.

(56) References Cited

U.S. PATENT DOCUMENTS 6,654,906 B1   11/2003   Arndt
6,912,648 B2 *  6/2005   Hammarlund et al. ...... 712/219
(Continued)

FOREIGN PATENT DOCUMENTS

TW    I236018 B      7/2005
TW   200912738 A     3/2009

OTHER PUBLICATIONS

First Office Action and IPO Search Report from foreign counterpart Taiwan Patent Application No. 101148752, mailed Jul. 25, 2014, 14 pages.
(Continued)

*Primary Examiner* — Daniel McMahon
(74) *Attorney, Agent, or Firm* — Nicholson De Vos Webster Elliott LLP

(57) ABSTRACT

An apparatus and method are described for detecting and correcting instruction fetch errors within a processor core. For example, in one embodiment, an instruction processing apparatus for detecting and recovering from instruction fetch errors comprises, the instruction processing apparatus performing the operations of: detecting an error associated with an instruction in response to an instruction fetch operation; and determining if the instruction is from a speculative access, wherein if the instruction is not from a speculative access, then responsively performing one or more operations to ensure that the error does not corrupt an architectural state of the processor core.

24 Claims, 7 Drawing Sheets

(51) Int. Cl.
*G06F 11/14* (2006.01)
*G06F 11/07* (2006.01)

(56) References Cited

U.S. PATENT DOCUMENTS

| | | | |
|---|---|---|---|
| 7,370,243 | B1 | 5/2008 | Grohoski et al. |
| 2004/0078559 | A1 | 4/2004 | Katayama et al. |
| 2005/0149781 | A1 | 7/2005 | Lempel et al. |
| 2006/0156123 | A1* | 7/2006 | Mukherjee et al. .......... 714/727 |
| 2009/0204766 | A1* | 8/2009 | Jacobi ................. G06F 12/0804 711/133 |
| 2009/0249033 | A1 | 10/2009 | Greenhalgh et al. |
| 2014/0189445 | A1* | 7/2014 | Raj et al. ........................ 714/57 |
| 2014/0298140 | A1* | 10/2014 | Yigzaw et al. ............... 714/768 |

OTHER PUBLICATIONS

International Preliminary Report on Patentability and the Written Opinion of the International Searching Authority from foreign counterpart PCT Application No. PCT/US2011/006982, mailed Jul. 3, 2014, 7 pages.

PCT/US2011/066982 Notification of Transmittal of the International Search Report and the Written Opinion of the International Searching Authority, or the Declaration, Mailed Sep. 28, 2012, 10 Pages.

Allowance Decision of Examination from foreign counterpart Taiwan Patent Application No. 101148752, mailed Nov. 26, 2015, 2 pages.

* cited by examiner

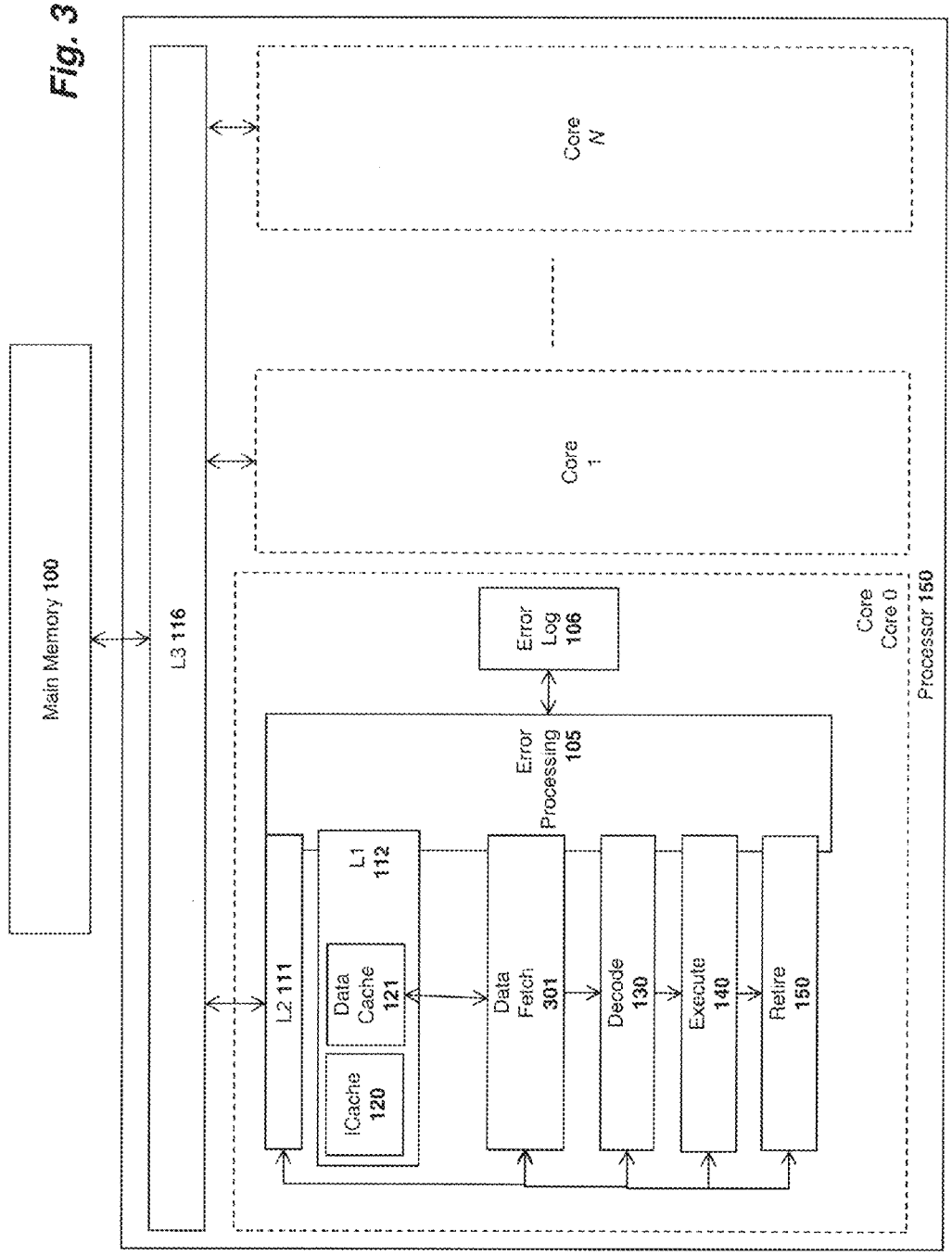

Error Log 106

| Errors | MCi_STATUS | | | | | | | | MCG_STATUS | | | | MCi_Addr | MCi_Misc |
|---|---|---|---|---|---|---|---|---|---|---|---|---|---|---|
| | MCACOD | UC | PCC | S | AR | ADDRV | MISCV | | Errored Thread | | Other Threads | | | |
| | | | | | | | | | RIP V | EIP V | RIP V | EIP V | | |
| Data Fetch Recoverable | 0 X 134 | 1 | 0 | 1 | 1 | 1 | 1 | | 0 | 1 | 1 | 0 | PA[45:6] | [5:0]=000110 [8:6]=010 |

*Fig. 4B*

APPARATUS AND METHOD FOR IMPLEMENT A MULTI-LEVEL MEMORY HIERARCHY

CROSS-REFERENCE TO RELATED APPLICATION

This patent application is a U.S. National Phase Application under 35 U.S.C. §371 of International Application No. PCT/US2011/066982, filed Dec. 22, 2011, entitled APPARATUS AND METHOD FOR DETECTING AND RECOVERING FROM INSTRUCTION FETCH ERRORS.

BACKGROUND

1. Field of the Invention

This invention relates generally to the field of computer processors. More particularly, the invention relates to an apparatus and method for detecting and correcting instruction fetch errors within a processor core.

2. Description of the Related Art

During normal operation, uncorrectable data errors encountered during the execution of a program are fatal to the whole system. With higher levels of integration in CPUs and ever smaller geometries, each occurrence of a fatal error detracts from the availability of the system. An additional implication is that with usage models such as virtual threading ("VT"), the "system" consists of a number of virtual machines ("VMs") which, for all intents and purposes, are running independent of each other. Therefore, when the system is brought down because of an error that occurred in one VM, it means that all VMs running on that system are brought down.

By way of example, in prior art Intel Architecture-32 (IA32) systems, uncorrected data errors encountered anywhere in the memory hierarchy during an instruction fetch or data fetch are immediately fatal. When such errors are encountered, the processor core logs a fatal error and signals the event immediately. The only action available to an OS or hypervisor at this point would is to bring down the whole system.

Consequently, it would be beneficial to design a system in which uncorrectable data errors during instruction fetch and/r data fetch can be isolated to the offending VM or application so that only that portion of the system implicated in the error is brought down, leaving all the others operational.

BRIEF DESCRIPTION OF THE DRAWINGS

A better understanding of the present invention can be obtained from the following detailed description in conjunction with the following drawings, in which:

FIG. 3 illustrates one embodiment of an architecture for detecting and correcting data fetch errors.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

System and Method for Recovery from Errors During Instruction Fetch

In one embodiment of the invention, an uncorrectable data error during instruction fetch is isolated to the offending virtual machine (VM) or application so that only that portion of the system that is implicated in the error is brought down, leaving all other portions operational. Corrupt data containment, referred to herein as "poisoning," is used to indicate the occurrence of an uncorrected error synchronous to the data. When an uncorrected data error is detected anywhere in the memory hierarchy, a "poison" indication is attached to the data, thereby deferring the handling of the error to the hardware that requested the data. In one embodiment, the poison indication is a single bit which is set to indicate poisoned data. As a result of these embodiments of the invention, the concept of corrupt data containment is extended into the processing core including the instruction and data fetch hardware.

Figure 1:
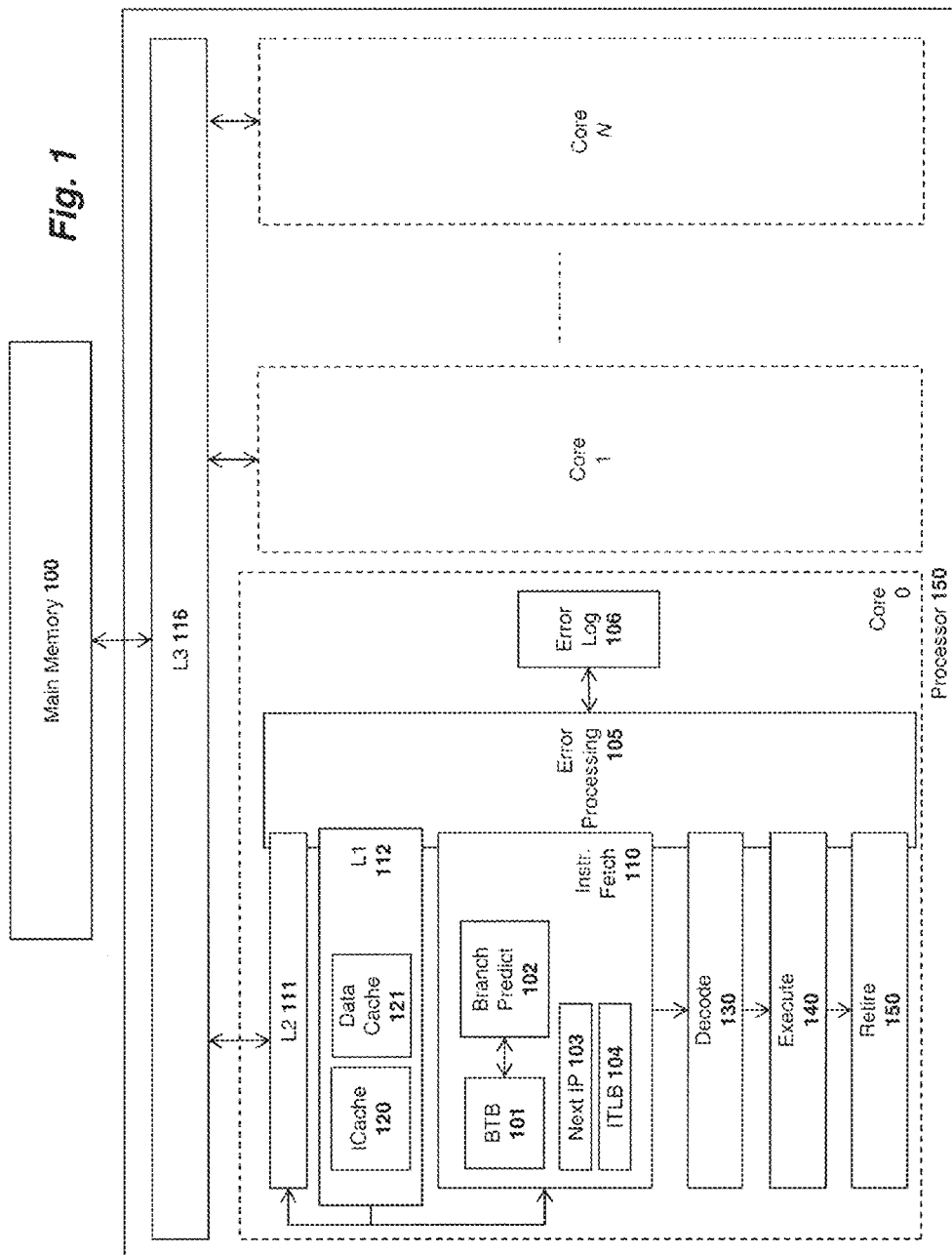
FIG. 1 illustrates one embodiment of an architecture for detecting and correcting instruction fetch errors.

FIG. 1 illustrates a processor architecture 150 according to one embodiment of the invention which includes one or more cores (identified as "Core 0," "Core 1," and Core N in FIG. 1). The details of a single core (Core 0) are illustrated in FIG. 1 for simplicity. It will be understood, however, that each core shown in FIG. 1 may have the same set of logic as Core 0.

As illustrated, the core may have a dedicated Level 1 (L1) cache 112 and Level 2 (L2) cache 111 for caching instructions and data according to a specified cache management policy. The L1 cache includes a separate instruction cache 120 for storing instructions and a separate data cache 121 for storing data. The instructions and data stored within the various processor caches are managed at the granularity of cache lines which may be a fixed size (e.g., 64 or 128 Bytes in length). Each core of this exemplary embodiment has an instruction fetch unit 110 for fetching instructions from main memory 100 and/or a Level 3 (L3) cache 116; a decode unit 130 for decoding the instructions (e.g., decoding program instructions into micro-operations or "uops"); an execution unit 140 for executing the instructions, and a retirement unit 150 for retiring the instructions.

The instruction fetch unit 110 includes various well known components including a next instruction pointer 103 for storing the address of the next instruction to be fetched from memory 100 (or one of the caches); an instruction translation look-aside buffer (ITLB) for storing a map of recently used virtual-to-physical instruction addresses to improve the speed of address translation; a branch prediction unit 102 for speculatively predicting instruction branch addresses; and branch target buffers (BTBs) 101 for storing branch addresses and target addresses. Once fetched, instructions are then streamed to the remaining stages of the instruction pipeline including the decode unit 130, the execution unit 140, and the retirement unit 150. The structure and function of each of these units is well understood by those of ordinary skill in the art and will not be described here in detail to avoid obscuring the pertinent aspects of the different embodiments of the invention.

As illustrated, error processing logic 105 is included within each core for implementing the error detection and recovery techniques described herein. In one embodiment, when the error processing logic 105 detects an uncorrected error in a cache line at any point in the memory hierarchy, instead of signaling and logging a fatal error (as in prior implementations), it attaches a "poison" indication to the cache line with the data, thereby deferring the handling of the error to the hardware that requested the data. In one embodiment, the error processing logic 105 detects an error by detecting that the cache line (or other block of data) has failed an error correction code (ECC) check such as a checksum. Each of the stages in the memory hierarchy including the main memory 100 and the various caches 111, 112, 116 may be equipped with ECC logic for determining the validity of data stored therein. In one embodiment of the invention, the error processing logic 105 identifies an error and attaches a poison indication when a cache line (or other block of data) fails its ECC check at one of these levels in the memory hierarchy.

In one embodiment, the error processing logic 105 will only react to poisoned instructions if the instructions are not due to a speculative access. If the access is on a speculative path (for example, due to a mis-predicted branch) the error processing logic 105 will neither log nor signal an error (i.e., because the error was not relevant to the current execution path). If, however, the poisoned instruction(s) within the cache line were received for a non-speculative access, the error processing logic 105 reacts by withholding the instruction(s) from consumption. In such a case, the error processing logic 105 will then clear the pipeline and the poisoned instruction(s) from the locality. It will then log and signal a recoverable instruction fetch error within an error log 106. In some cases, it is possible for the poisoned part of the cache line not to be consumed immediately. In these cases, the error processing logic 105 will move the whole cache line into the instruction cache ("Icache") 120 in a poisoned state (i.e., along with the attached poison indication). The next time the cache line is accessed, it will be discovered in the poisoned state in the Icache based on the poisoned indication. When this happens, one embodiment of the error processing logic 105 will invalidate the cache line in the Icache 120, treat the access as a cache miss and request the data from the memory hierarchy (e.g., from the main memory 100).

In one embodiment, when the error processing logic 105 logs a recoverable instruction fetch error in the error log 106, it does so with a specific signature. The error log 106 also includes the system address of the request that generated the error. The system address is essential for error handling software to isolate the error to the process or VM (in a VT environment) that is affected by this error. In one embodiment, system software can then read the error log 106 and carry out recovery by terminating the affected processes or VM and returning to the rest, without bringing down the whole system.

Figure 2:
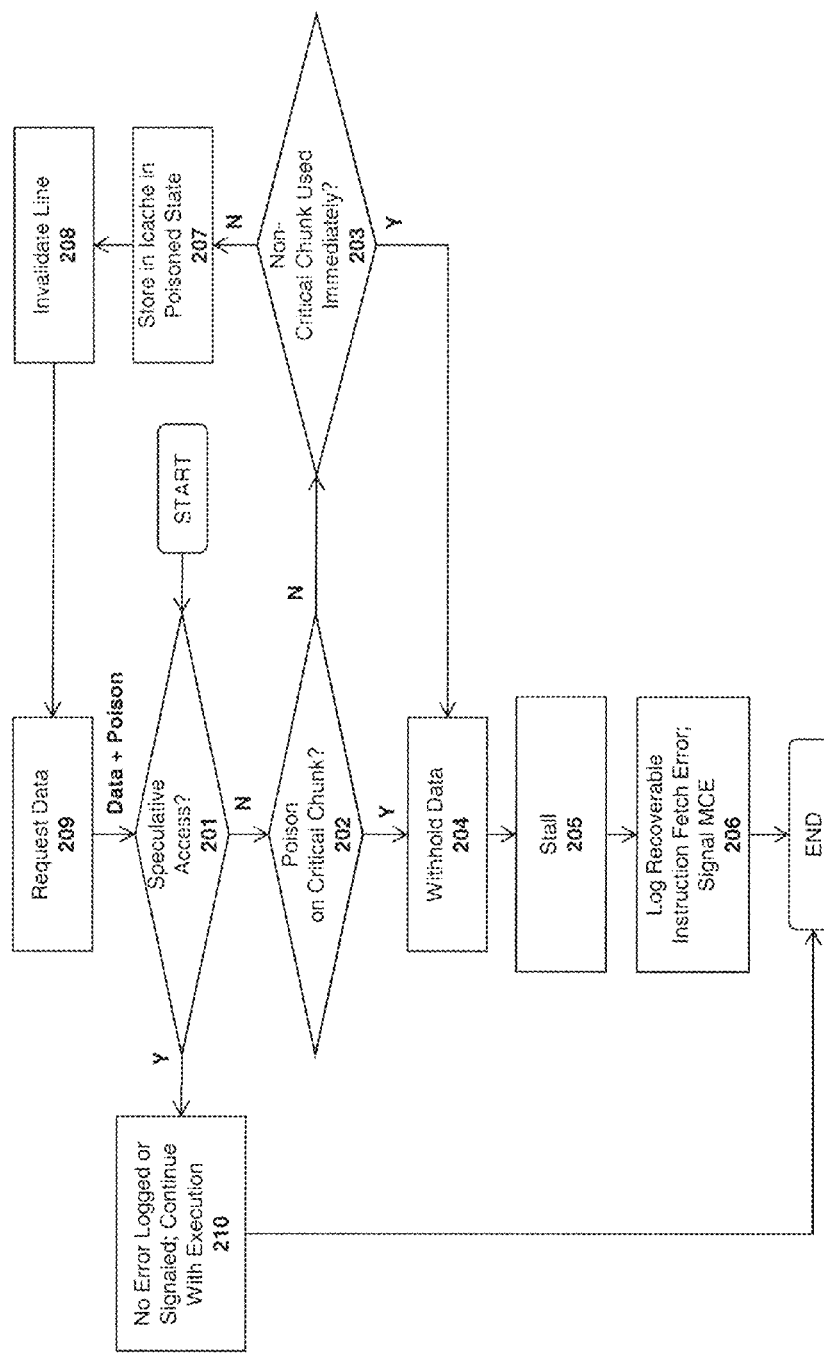
FIG. 2 illustrates one embodiment of a method for detecting and correcting instruction fetch errors.

FIG. 2 illustrates one embodiment of a process for detecting and processing errors during instruction fetch. The process may be implemented by the error processing logic 105 shown in FIG. 1 but is not necessarily limited to any particular processor architecture.

At 201, a determination is made as to whether the error is associated with a speculative access (e.g., a speculated branch instruction). If so, then at 210 no error is logged or signaled and program execution continues (i.e., because the error was not relevant to the current execution path). If the error is associated with a non-speculative access then steps are taken to ensure that the poisoned instruction is not consumed. In one embodiment, each cache line is comprised of two 32-Byte "chunks." Thus, at 202, a determination is made as to whether the poisoned instruction is associated with a critical chunk (i.e., one which will be used). If so, then the data is withheld at 204 and, at 205, instruction execution is stalled. A recoverable instruction fetch error is logged and a machine check exception (MCE) is signaled at 206 (i.e., to notify the MCA of a machine check event). As is well known by those of ordinary skill in the art, MCA refers to a mechanism in which the CPU reports hardware errors to the operating system.

If, however, at 202, it is determined that the poison is not on a critical chunk, then at 203 a determination is made as to whether the non-critical chunk will be used immediately. If so, then the process returns to operation 204. If not, then at 207, the cache line is stored in the instruction cache in a poisoned state. The next time the cache line is accessed, at 208, the cache line is discovered in the poisoned state and the cache line is invalidated. Once invalidated, the access to the cache line is treated as a cache miss and the data is requested from further up the memory hierarchy.

System and Method for Recovery From Errors During Data Fetch

FIG. 3 illustrates one embodiment of the invention in which the error processing logic 105 uses data poisoning techniques during data fetch operations. While not illustrated together in a single figure, this embodiment may be employed within the same processor architecture as the embodiments used to recover from errors during instruction fetch described above with respect to FIGS. 1-2.

As mentioned, data poisoning is a technique employed in one embodiment of the invention so that an error is isolated and not permitted to corrupt the architectural state of the processor (which would affect the entire computer system). In prior systems, an uncorrected data error detected in one of a processor's cores would cause the hardware to broadcast an error immediately. However, the corrupted data would still be sent to its destination where it would be consumed, causing the computer system's architectural state to be corrupted (generally referred to as "Processor Context Corrupt" in the Machine Check Architecture (MCA) error log).

Corrupt data containment as defined herein starts with an uncorrectable data error discovered anywhere in the system (e.g., within the cache hierarchy or memory or any other temporary storage of data or device). As mentioned above, the error may be detected at each stage of the memory hierarchy using various known error correction code (ECC) techniques. In one embodiment, when a data error is detected, the error processing logic 105 attaches a poison indication to the data, which is then communicated along with the data down the processor pipeline wherever and whenever the data is transmitted.

FIG. 3 illustrates one embodiment of a processor 150 architecture which includes a plurality of cores, identified as core 0, core 1, . . . core N. The details of a single core (Core 0) with respect to one embodiment of the invention are illustrated in FIG. 3 for simplicity. It will be understood, however, that each core shown in FIG. 3 may have the same set of logic as Core 0 with respect to the embodiments of the invention. Additionally, it will be understood that non-homogeneous cores may be employed while still complying with the underlying principles of the invention.

A data fetch unit 301 is illustrated for fetching data from a cache/memory subsystem comprising a level 1 (L1) cache 112, Level 2 (L2) cache 111, Level 3 (L3) cache 116 and main memory 100. The L1 cache includes a dedicated instruction cache (ICache) 120 for storing instructions and a dedicated data cache 121 for storing data. As mentioned, the instructions and data stored within the various processor caches may be managed at the granularity of cache lines of a fixed size (e.g., 64 or 128 Bytes in length). A decode unit 130 is illustrated for decoding instructions (e.g., decoding program instructions into micro-operatons or "uops"); an execution unit 140 for executing the instructions; and a retirement unit 150 for retiring the instructions (e.g., updating sets of the processor's 150's architectural state registers following the execution of each instruction).

Figure 4A:
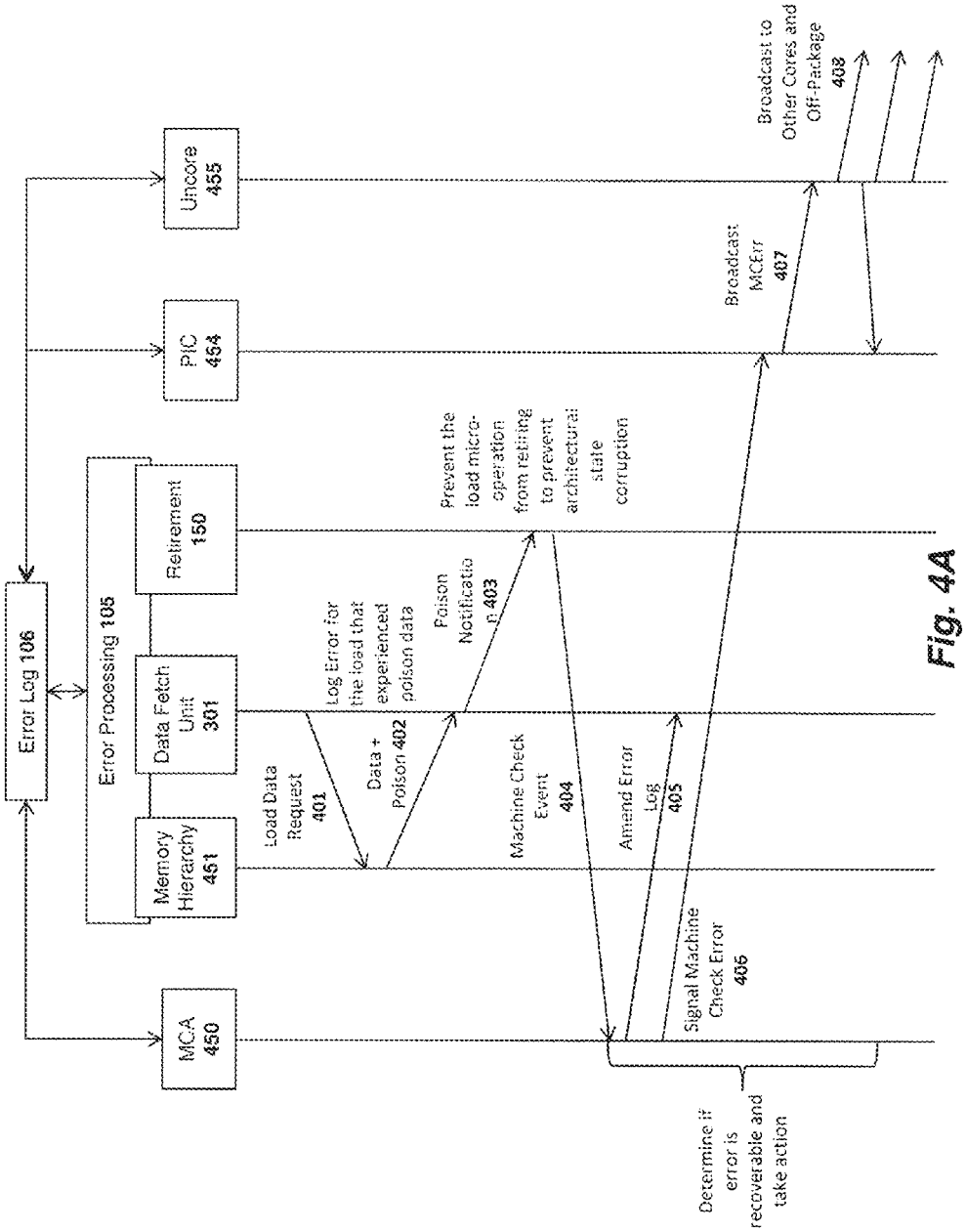
FIG. 4 illustrates a transaction diagram showing one embodiment of a method for detecting and correcting data fetch errors.

A transaction diagram illustrating the operation of one embodiment of the invention is illustrated in FIG. 4A. In this embodiment, an instruction has been decoded by the decode unit 130, resulting in a plurality of micro-operations, one of which is a load micro-operation 401 serviced by the data fetch unit 301. In response, the data fetch unit 301 attempts to fetch the requested data from the memory hierarchy 451. In the example shown in FIG. 4A, the error processing component 105 of the memory hierarchy 451 returns data with a poison indication 402 to the data fetch unit 301. For example, the error processing logic 105 may detect an ECC failure associated with the data when retrieving data from the various caches 111-112, 116 and/or the main memory 100.

In response, the error processing component 105 of the data fetch unit 301 ensures that the load operation does not retire (get committed to architectural state) by logging the error within the error log 106 and transmitting a poison notification 403 to the retirement unit 150. In one embodiment, the "notification" is the update to the error log 106 which is accessible by the retirement unit 150. For example, the retirement unit 150 may subsequently read the error log 106 to determine if an error is associated with the load operation. If an error is detected by the retirement unit 150 then, in one embodiment, it will not commit the load operation to update the architectural state of the core. Regardless of how the notification is implemented, as indicated in FIG. 4A, the notification to the retirement unit 150 is the first step to ensure that the error does not result in the modification of the architectural state of the core (i.e., the error's effect has been limited to the process, application or VM that tried to consume the bad data and thus encountered the error).

In one embodiment, after the load operation is denied retirement, the next step is to ensure that no architectural state is modified by the instruction that spawned the micro-operation which attempted to load corrupted data (i.e., which generated the load data request micro-operation 401). In one embodiment, this is accomplished by preserving the architectural state which existed before attempting to execute the instruction that encountered corrupted data.

In one embodiment, to ensure that the error is linked to a specific instruction and a specific system address, indications of both the specific instruction and system address are stored by the error processing logic 105 within the error log 106. Linking the error to a specific instruction and system address is necessary for isolation because the system address is what the error handling software will use to decide the scope of the error (e.g., which processes/VM are affected by the error). Thus, in one embodiment, when the error processing logic 105 logs the error it includes the system address for the load that experienced the error.

Finally, the hardware must communicate the nature of the error to the error handling software, which is responsible for taking the recovery action. As illustrated in FIG. 4A, in one embodiment, this is accomplished via a Machine Check Event 404 transmitted to the Machine Check Architecture 450 of the system, which is accessible by software. The assignee of the present application has developed a Machine Check Architecture (MCA) for its family of processor architectures including, by way of example and not limitation, the Pentium™, Xeon™, Itanium™, Itanium™, and Intel Core™ family of processors. The MCA provides a mechanism for detecting and reporting hardware (machine) errors, such as system bus errors, ECC errors, parity errors, cache errors, and translation lookaside buffer errors. It includes a set of model-specific registers (MSRs) that are used to set up machine checking and additional banks of MSRs used for recording errors that are detected. Thus, in one embodiment, the MSRs of the MCA store the system address where the error occurred which is then read by the software. The software may then determine if the error is recoverable and take an appropriate action. For example, the software may then use the system address to determine which process, application or virtual machine encountered the error, and can then take action by either terminating the offending process, application or virtual machine, and allowing all others to continue. In one embodiment, the software may also re-initiate the request for the data so that a "clean" copy (i.e., one without errors) of the data is fetched from memory or disk.

Returning to the transaction diagram in FIG. 4A, following the registration of the machine check event 404 to the MCA 450, the MCA transmits a command to the data fetch unit 301 to amend the error log based on the results of the machine check operations. In addition, a machine check error signal is propagated to the programmable interrupt controller (PIC) 454 at 406, which broadcasts a machine check error indication at 407 to the logic outside of the core in which the error occurred—commonly referred to as the uncore 455.

The uncore 455 may include, for example, the communication pathways between each of the cores, to the main memory 100 and input/output (I/O) interfaces (not shown). In one embodiment, at 408, the machine check error is broadcast to the other cores in the processor 150 and/or to other components located off of the processor package (e.g., memory and/or I/O devices) so that they may take appropriate action to handle the error. In one embodiment, these components may determine that there is a recoverable error by reading the error log 106. In the exemplary error log shown in FIG. 4B, a recoverable error is indicated if the processor context is not corrupt as indicated by MCi_STATUS.PCC=0, the system address is available as indicated by MCi_STATUS.ADDRV=1 and MCi_MISC[8:6]='010. In one embodiment, the MCACOD field and MCG_STATUS fields are different to distinguish between for the instruction fetch vs. the data fetch error logs. The following fields have the following meanings in one embodiment of the error log:

In MCi_STATUS:
  MCACOD=architecturally specified error code that
    describes the type of error encountered.

UC=Uncorrected. When '1 the error was of an uncorrected type. When '0 the error was of a corrected type.

PCC=Processor Context Corrupt. When set it means the processor context was corrupt. When clear it means it was not.

S=signaling. When set the error logged was signaled via a machine check exception. When clear it was signaled via a CMCI.

AR=Action Required. When set, SW must take immediate action. When clear SW may delay the action until a later time.

ADDRV—Address Valid. When set it indicates that a valid address was logged in MCi_ADDR MSR. When clear it indicates no valid address exists.

MISCV=MCi_MISC Valid. When set it indicates that there is valid content in the MCi_MISC MSR. When clear it indicates that there is no valid content in MCi_MISC.

In MCG_STATUS:

RIPV=Restart IP Valid. When set it indicates that program execution can be restarted reliably at the instruction pointed to by the instruction pointer pushed on the stack by the machine check exception handler call. When clear, the program cannot be reliably restarted at the pushed instruction pointer.

EIPV=Error IP Valid. Indicates (when set) that the instruction pointed to by the instruction pointer pushed onto the stack when the machine check exception is generated is directly associated with the error. When this flag is cleared, the instruction pointed to may not be associated with the error.

MCi_ADDR—contains the address associated with the error.

MCi_MISC[5:0]—contains the LSB of the address captured in MCi_ADDR.

MCi_MISC[8:6]—contains the address type (one of segment offset, linear address, system address, memory address or generic) captured in MCi_ADDR.

Of course, the underlying principles of the invention are not limited to any particular organization of data stored in the error log.

Figure 5:
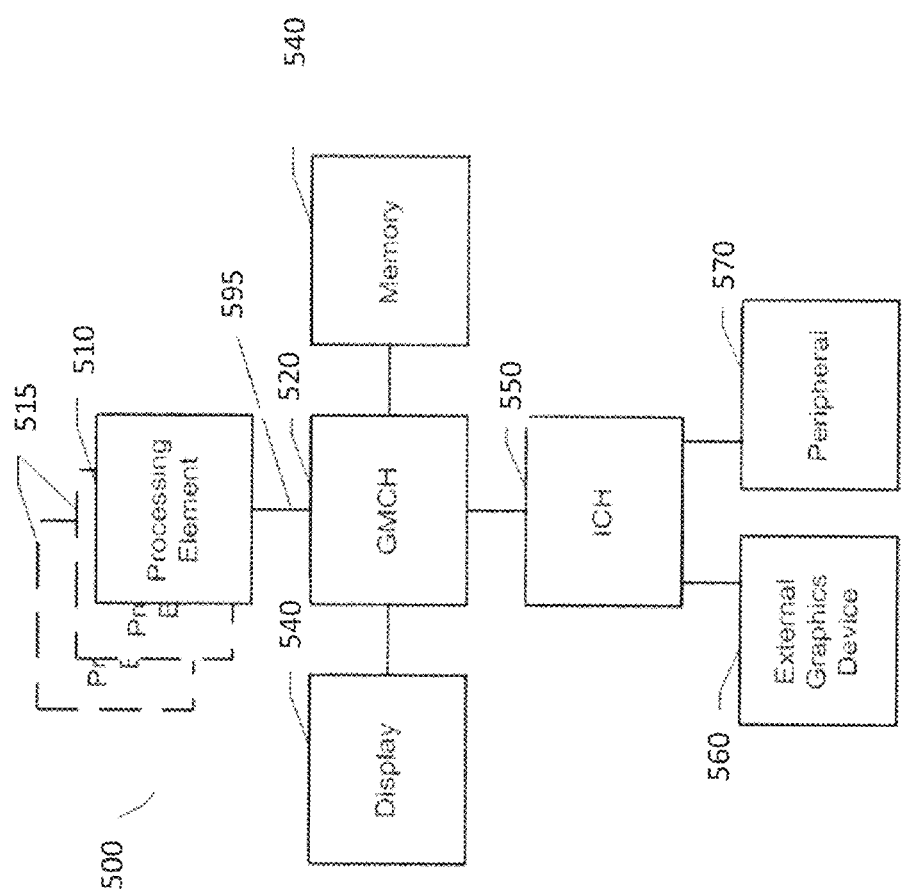
FIG. 5 illustrates a data fetch error log in accordance with one embodiment of the invention.

Referring now to FIG. 5, shown is a block diagram of another computer system 500 in accordance with one embodiment of the present invention. The system 500 may include one or more processing elements 510, 515, which are coupled to graphics memory controller hub (GMCH) 520. The optional nature of additional processing elements 515 is denoted in FIG. 5 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multithreaded in that they may include more than one hardware thread context per core.

FIG. 5 illustrates that the GMCH 520 may be coupled to a memory 540 that may be, for example, a dynamic random access memory (DRAM). The DRAM may, for at least one embodiment, be associated with a non-volatile cache.

The GMCH 520 may be a chipset, or a portion of a chipset. The GMCH 520 may communicate with the processor(s) 510, 515 and control interaction between the processor(s) 510, 515 and memory 540. The GMCH 520 may also act as an accelerated bus interface between the processor(s) 510, 515 and other elements of the system 500.

For at least one embodiment, the GMCH 520 communicates with the processor(s) 510, 515 via a multi-drop bus, such as a frontside bus (FSB) 595.

Furthermore, GMCH 520 is coupled to a display 540 (such as a flat panel display). GMCH 520 may include an integrated graphics accelerator. GMCH 520 is further coupled to an input/output (I/O) controller hub (ICH) 550, which may be used to couple various peripheral devices to system 500. Shown for example in the embodiment of FIG. 5 is an external graphics device 560, which may be a discrete graphics device coupled to ICH 550, along with another peripheral device 570.

Alternatively, additional or different processing elements may also be present in the system 500. For example, additional processing element(s) 515 may include additional processors(s) that are the same as processor 510, additional processor(s) that are heterogeneous or asymmetric to processor 510, accelerators (such as, e.g., graphics accelerators or digital signal processing (DSP) units), field programmable gate arrays, or any other processing element. There can be a variety of differences between the physical resources 510, 515 in terms of a spectrum of metrics of merit including architectural, microarchitectural, thermal, power consumption characteristics, and the like. These differences may effectively manifest themselves as asymmetry and heterogeneity amongst the processing elements 510, 515. For at least one embodiment, the various processing elements 510, 515 may reside in the same die package.

Figure 6:
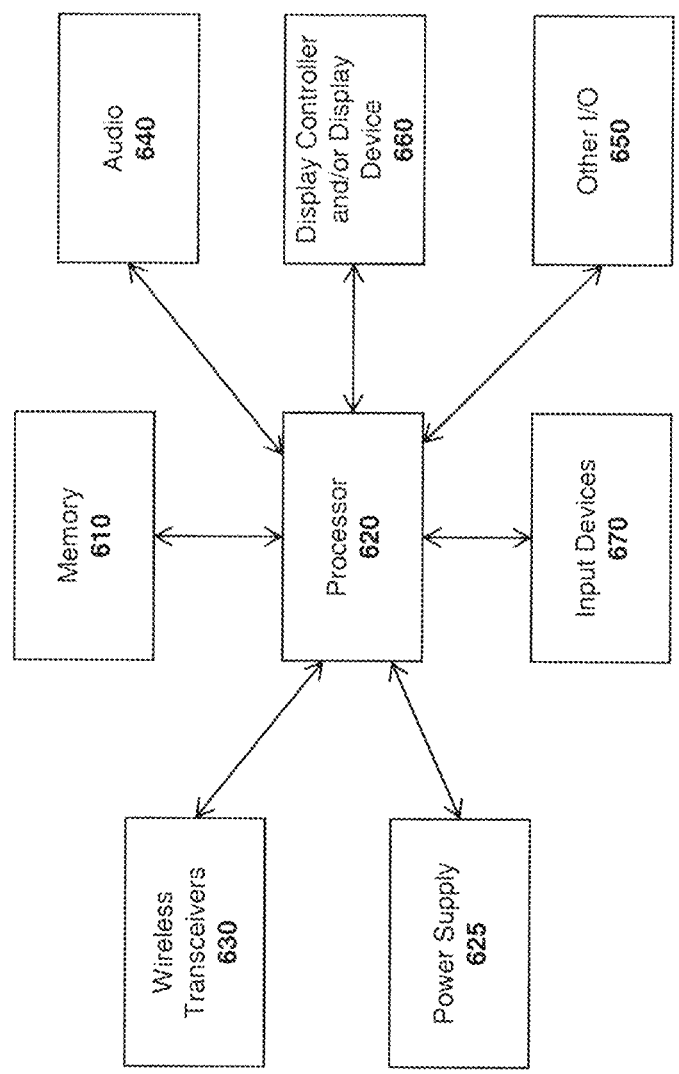
FIG. 6 illustrates one embodiment of a computer architecture on which embodiments of the invention may be implemented.

FIG. 6 is a block diagram illustrating another exemplary data processing system which may be used in some embodiments of the invention. This data processing system may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 500 may be a network computer or an embedded processing device within another device.

According to one embodiment of the invention, the exemplary architecture of the data processing system may be used for the mobile devices described above. The data processing system 600 includes the processing system 620, which may include one or more microprocessors and/or a system on an integrated circuit. The processing system 620 is coupled with a memory 610, a power supply 625 (which includes one or more batteries) an audio input/output 640, a display controller and display device 660, optional input/output 650, input device(s) 670, and wireless transceiver(s) 630. It will be appreciated that additional components, not shown in FIG. 6, may also be a part of the data processing system 600 in certain embodiments of the invention, and in certain embodiments of the invention fewer components than shown in FIG. 6 may be used. In addition, it will be appreciated that one or more buses, not shown in FIG. 6, may be used to interconnect the various components as is well known in the art.

The memory 610 may store data and/or programs for execution by the data processing system 600. The audio input/output 540 may include a microphone and/or a speaker to, for example, play music and/or provide telephony functionality through the speaker and microphone. The display controller and display device 660 may include a graphical user interface (GUI). The wireless (e.g., RF) transceivers 630 (e.g., a WiFi transceiver, an infrared transceiver, a Bluetooth transceiver, a wireless cellular telephony transceiver, etc.) may be used to communicate with other data processing systems. The one or more input devices 670 allow a user to provide input to the system. These input devices may be a keypad, keyboard, touch panel, multi touch panel, etc. The optional other input/output 650 may be a connector for a dock.

Other embodiments of the invention may be implemented on cellular phones and pagers (e.g., in which the software is embedded in a microchip), handheld computing devices (e.g., personal digital assistants, smartphones), and/or touchtone telephones. It should be noted, however, that the underlying principles of the invention are not limited to any particular type of communication device or communication medium.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method for detecting and recovering from instruction fetch errors within a processor core comprising:
   detecting an error associated with an instruction in response to an instruction fetch operation; and
   determining if the instruction is from a speculative access, wherein
   if the instruction is not from a speculative access, then responsively performing one or more operations to ensure that the error does not corrupt an architectural state of the processor core, and
   if the instruction is from a speculative access, then not performing the one or more operations.

2. The method as in claim 1 wherein responsively performing the one or more operations comprises attaching a poison indication to the instruction.

3. The method as in claim 2 further comprising:
   transmitting the poison indication with the instruction down a processor pipeline to provide the poison indication to stages and units within the processor pipeline.

4. The method as in claim 3 wherein the poison indication is transmitted to a retirement unit to ensure that the retirement unit does not retire the instruction fetch operation which resulted in the error.

5. The method as in claim 1 wherein the error is detected in a chunk of data equal to a specified fraction of a cache line.

6. The method as in claim 5 wherein the chunk of data comprises one half of the cache line.

7. The method as in claim 6 wherein the cache line is 64 Bytes and the chunk of data comprises 32 Bytes.

8. The method as in claim 1 wherein detecting an error comprises executing an error correction code (ECC) operation on a chunk of data.

9. An instruction processing apparatus for detecting and recovering from instruction fetch errors comprising, the instruction processing apparatus performing:
   detecting an error associated with an instruction in response to an instruction fetch operation; and
   determining if the instruction is from a speculative access, wherein
   if the instruction is not from a speculative access, then responsively performing one or more operations to ensure that the error does not corrupt an architectural state of a processor core containing the instruction processing apparatus, and
   if the instruction is from a speculative access, then not performing the one or more operations.

10. The apparatus as in claim 9 wherein responsively performing the one or more operations comprises attaching a poison indication to the instruction.

11. The apparatus as in claim 10 further comprising:
    transmitting the poison indication with the instruction down a processor pipeline to provide the poison indication to stages and units within the processor pipeline.

12. The apparatus as in claim 11 wherein the poison indication is transmitted to a retirement unit to ensure that the retirement unit does not retire the instruction fetch operation which resulted in the error.

13. The apparatus as in claim 9 wherein the error is detected in a chunk of data equal to a specified fraction of a cache line.

14. The apparatus as in claim 13 wherein the chunk of data comprises one half of the cache line.

15. The apparatus as in claim 14 wherein the cache line is 64 Bytes and the chunk of data comprises 32 Bytes.

16. The apparatus as in claim 9 wherein detecting an error comprises executing an error correction code (ECC) operation on a chunk of data.

17. A computer system comprising:
    a central processing unit including at least one processor core having a plurality of instruction processing stages including an instruction fetch stage and an instruction retirement stage;
    error processing logic in communication with the processing stages to perform:
      detecting an error associated with an instruction in response to an instruction fetch operation; and
      determining if the instruction is from a speculative access, wherein
      if the instruction is not from a speculative access, then responsively performing one or more operations to ensure that the error does not corrupt an architectural state of the processor core, and if the instruction is from a speculative access, then not performing the one or more operations.

18. The computer system as in claim 17 wherein responsively performing the one or more operations comprises attaching a poison indication to the instruction.

19. The computer system as in claim 18 wherein the error processing logic performs an additional operation of:

transmitting the poison indication with the instruction down a processor pipeline to provide the poison indication to stages and units within the processor pipeline.

20. The computer system as in claim 19 wherein the poison indication is transmitted to a retirement unit to ensure that the retirement unit does not retire fetch operation of the instruction that resulted in the error.

21. The computer system as in claim 17 wherein the error is detected in a chunk of data equal to a specified fraction of a cache line.

22. The computer system as in claim 21 wherein the chunk of data comprises one half of the cache line.

23. The computer system as in claim 22 wherein the cache line is 64 Bytes and the chunk of data comprises 32 Bytes.

24. The computer system as in claim 17 wherein detecting an error comprises executing an error correction code (ECC) operation on a chunk of data.

\* \* \* \* \*